June 16, 1936.   L. O. BURT   2,044,463
TRANSMISSION CONTROLLING DEVICE
Filed March 29, 1935   2 Sheets-Sheet 1

INVENTOR.
Leo. O. Burt.
BY
Edwin C. McRae.
ATTORNEY.

June 16, 1936.  L. O. BURT  2,044,463
TRANSMISSION CONTROLLING DEVICE
Filed March 29, 1935  2 Sheets-Sheet 2
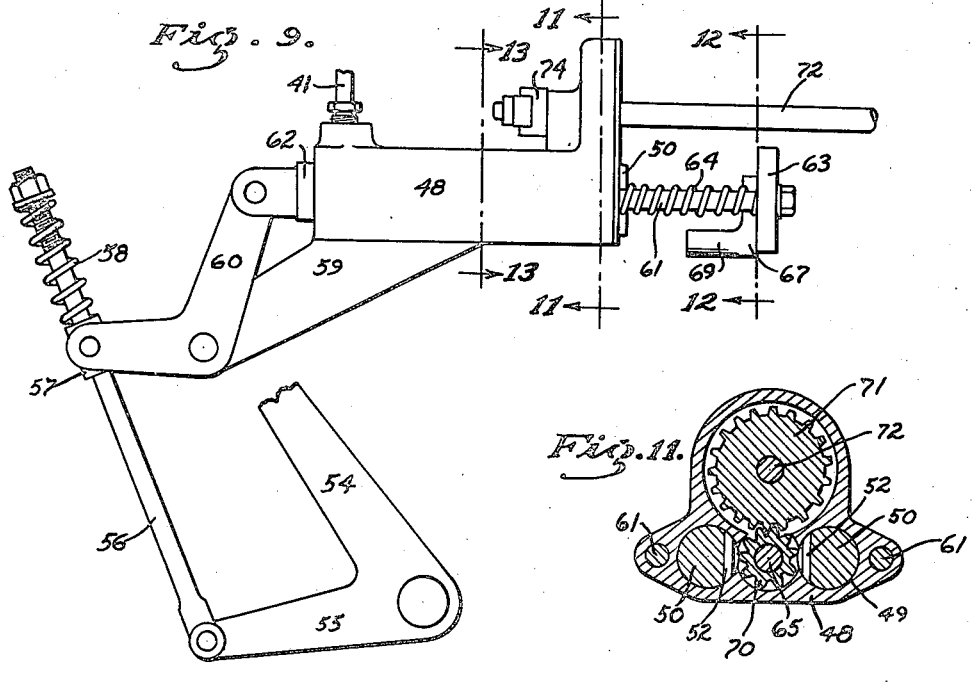
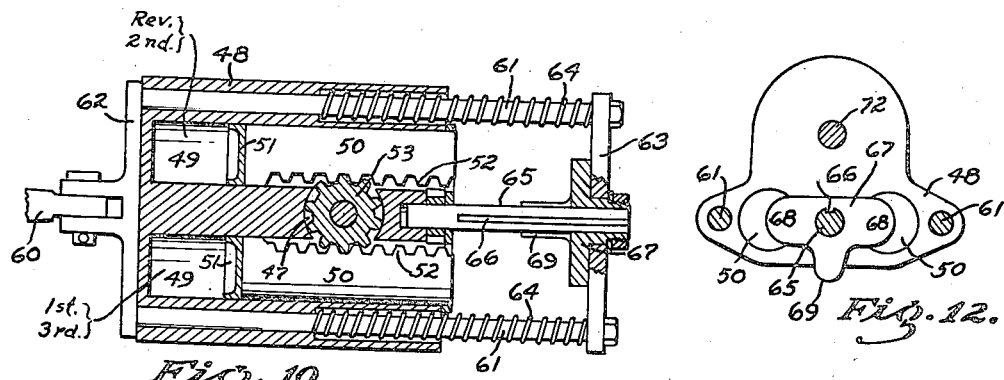
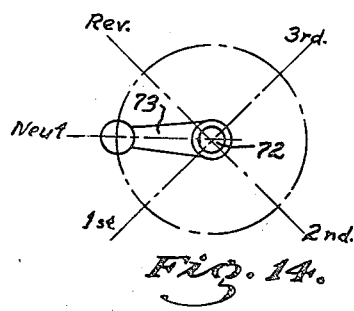
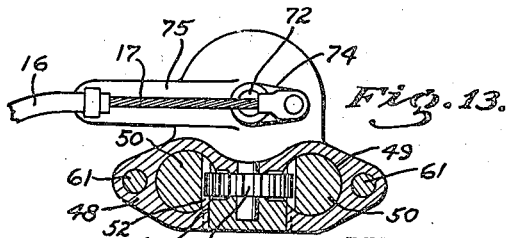
INVENTOR.
Leo O. Burt.
BY
Edwin C. McRae
ATTORNEY.

Patented June 16, 1936

2,044,463

UNITED STATES PATENT OFFICE 2,044,463

TRANSMISSION CONTROLLING DEVICE

Leo O. Burt, Dearborn, Mich.

Application March 29, 1935, Serial No. 13,692

10 Claims. (Cl. 74—346)

The object of my invention is to provide a transmission controlling device especially adapted for effecting the several speed ratios obtainable with the conventional automobile sliding gear type transmission. Heretofore, such transmissions were usually provided with a gear shift lever which extended from the transmission upwardly into the driving compartment of the car. While such shift lever was quite satisfactory in the past, still, many conditions encountered in recent automobile designs have made the use of such device less desirable than formerly. For example, the front seats of recent designs of cars are now being widened to accommodate three persons so that the conventional gear shift lever has interfered with the foot room of the center passenger. For this reason, it is desirable to remove the shift lever from the floor of the car and to place the control handle closer to the driver and in position where it does not interfere with the foot room of any of the occupants. Further, certain new designs of automobiles have the engine and transmission located at the rear of the car and in such installations it is essential that the driver be able to conveniently shift the transmission. The applicant's device is particularly adapted for rear engined installations, inasmuch as it is relatively unimportant at what position the transmission is located relative to the controlling mechanism.

Still a further object of my invention is to provide a controlling mechanism for transmissions wherein a fluid medium is employed to transmit the shifting force from the controlling lever to the transmission gears and wherein mechanical means is employed for selecting the particular transmission gear which is actuated by this fluid medium. By this combination of mechanical and fluid operating means, the major inherent defects in both the mechanical and fluid systems heretofore employed are believed eliminated.

Still a further object of my invention is to provide a device of the character described which will be relatively inexpensive to manufacture and which will require no major alterations to adapt same to the conventional sliding gear type transmission. In the accompanying specification I have shown both a hand operated device wherein the power required to shift the gears is transmitted from the control lever directly to the transmission, and also a pre-selecting device wherein the control lever only selects the gear to be shifted, the power required to shift being supplied by the clutch pedal operation.

With these and other objects in view, my invention consists in the arrangement, construction and combination of the various parts of my improved device, as described in the specification, claimed in my claims and illustrated in the accompanying drawings, in which:

Figure 9 shows a side elevation of my pre-selector mechanism which may be used in place of the manual operating device, shown in the foregoing views.

Figure 10 is a horizontal sectional view, taken through the pre-selector shown in Figure 9.

Figure 11 is a sectional view, taken on the line 11—11 of Figure 9.

Figure 12 is a sectional view, taken on the line 12—12 of Figure 9.

Figure 13 is a sectional view, taken on the line 13—13 of Figure 9, and

Figure 14 is a diagrammatic view showing the several positions of the selector handle for effecting the various speeds in the transmission.

Figure 1:
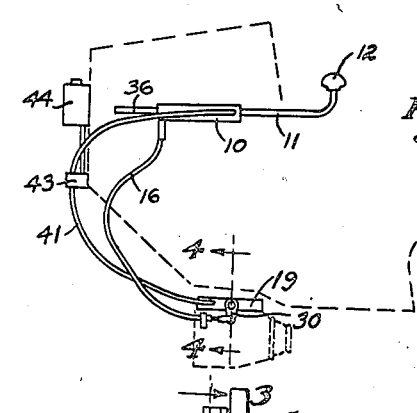
Figure 1 is a diagrammatic view illustrating the position of either of my control units and its connection with a conventionally placed transmission. The manual control unit is shown in this view.
Figure 8:
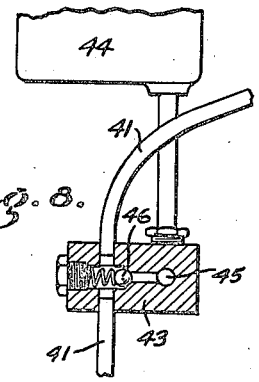
Figure 8 is a vertical sectional view taken through a fluid replenishing valve which is provided to automatically maintain the correct amount of fluid in the system.

Referring to the accompanying drawings, I have used the reference numeral 10 to indicate a housing member which is adapted to be secured in a fixed position beneath the cowl of the vehicle. The housing 10 is preferably formed as a casting having a rectangular shape with a central longitudinal bore therethrough in which a control rod 11 is both rotatably and reciprocally mounted. The housing 10 is mounted in a horizontal position in the vehicle so that the rod 11 may be moved fore and aft therethrough and may also be rotated therein. The rearmost end of the rod 11 extends rearwardly of the instrument board and is curved upwardly, the upper end of the rod having a control ball 12 secured thereto. For normal operation, the ball 12 is rocked laterally to select the particular transmission shifter shaft which is to be moved, while the ball is pushed fore and aft to control the direction and movement of the particular shaft being moved. The positions of the ball 12 for the various shifts are identical to the positions of the ball on the conventional shifter lever for the various speeds effected thereby.

Figure 2:
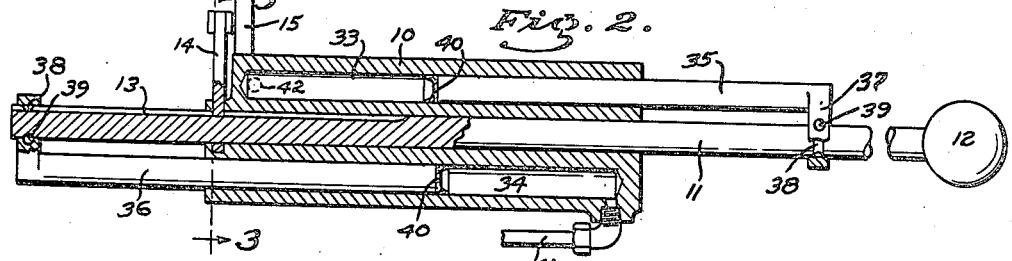
Figure 2 is a longitudinal sectional view, taken through the control unit, shown in Figure 1.
Figure 3:
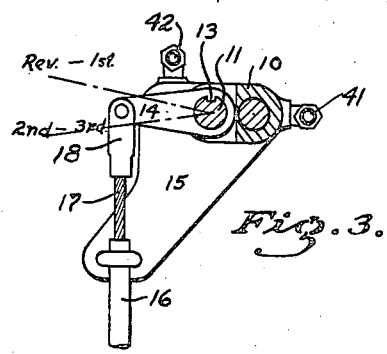
Figure 3 is a sectional view, taken on the line 3—3 of Figure 2.
Figure 5:
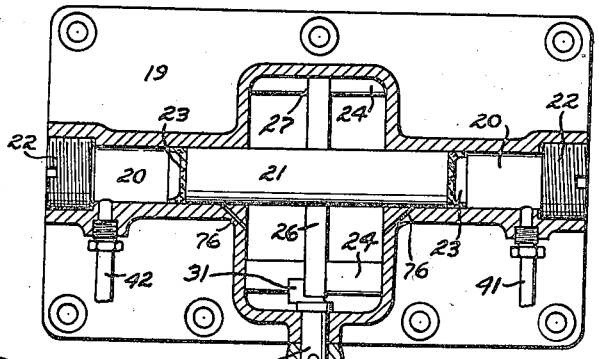
Figure 5 is a sectional view, taken on the line 5—5 of Figure 4.
Figure 6:
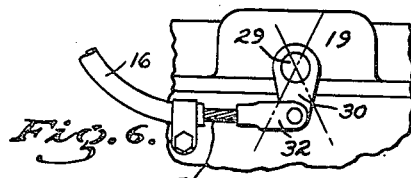
Figure 6 is a side view of the transmission cover, shown in Figure 4.
Figure 4:
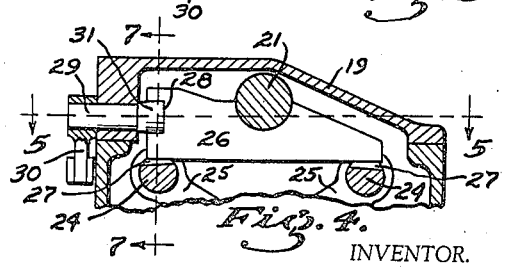
Figure 4 is a sectional view, taken on the line 4—4 of Figure 1.
Figure 7:
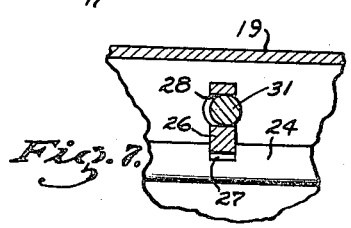
Figure 7 is a sectional view, taken on the line 7—7 of Figure 4.

It will be noted from Figure 2 that the rod 11 projects from the forward end of the housing 10 and that the projecting portion of this rod is provided with a keyway 13 therein. An arm 14 is mounted in a slot formed in the forward end of the housing 10. The rod 11 extends through a central opening in this arm, and a key extends from the arm into the keyway 13. Thus, oscillation of the rod 11 causes the arm 14 to oscillate, while reciprocation of the rod 11 causes no change in the position of this arm. A bracket 15 extends downwardly from the housing member 10 and a Bowden wire casing 16 is fixed to this bracket. A flexible wire 17 is reciprocally mounted within the casing 16, one end of which is secured to a clevis 18 and which clevis is secured to the free end of the arm 14. Oscillation of the rod 11 thereby reciprocates the wire 17 through the casing 16.

In order to adapt this device to the conventional sliding gear transmission, a special transmission cover is required, this cover being designated by numeral 19 in the drawings, and being adapted to be secured over the top portion of the transmission in the conventional manner. This cover is provided with a longitudinal bore 20 therethrough in which a piston 21 is reciprocally mounted. It will be noted that each end of the bore 20 is provided with a plug 22 and that conventional leather or rubber cup washers 23 are provided on each end of the piston 21. This piston 21 is of sufficient length that chambers are formed between each end of the piston and the plugs 22. Means will subsequently be described to bring out the manner in which the piston 21 is reciprocated; however, the mechanism whereby the piston 21 is selectively connected to the respective shifter shafts in the transmission will now be disclosed.

The conventional sliding gear type transmission is provided with a pair of laterally spaced shafts 24 which are reciprocally mounted for longitudinal movement in the transmission. Shifter forks 25 are secured to the respective shafts 24, these forks coacting with annular grooves which are formed in the various gears to be shifted. These forks and shafts 24 are invariably provided in sliding gear transmissions. It is usual to so design the transmission that one of the shafts is moved forwardly and rearwardly from a neutral position to effect the low and reverse speeds of the transmission; while the other shaft is shifted forwardly and rearwardly from the neutral position to effect the second and direct drives in the transmission.

The piston 21 shifts forwardly and rearwardly from a neutral position and a beam 26 is secured to the intermediate portion of the piston 21 with the ends of the beam disposed adjacent to the center portions of each shaft 24. Each of the shafts 24 is provided with a transverse slot 27 at its center portion, into which the beam 26 may extend when it is rocked. When one end of the beam fits in one of the slots 27, the other end of the beam will be entirely out of the other slot. Thus, when the beam is rocked in one of its engaged positions, reciprocation of the piston 21 will cause reciprocation of one shaft 24, and when the beam is oscillated to its other engaged position then the other of the shafts may be reciprocated by the piston 21. The conventional transmission is provided with interlocking mechanism so that both of the shafts 24 may not be simultaneously shifted; however, this mechanism is not described herein as it forms no part of my invention and as any of the several types of interlocking mechanisms may be employed herein. A pair of bleeder openings 76 are provided in the bore 20 at the end of the piston stroke so as to center the piston in the neutral position.

In order to selectively oscillate the beam 26, one edge of this beam is provided with cam slot 28 therein. A shaft 29 is rotatably mounted in the cover 19, the outer end of this shaft having an arm 30 secured thereon, while the inner end of the shaft is provided with an eccentric cam member 31 which fits into the slot 28 in the beam 26. Oscillation of the arm 30 actuates the eccentric cam 31 to raise and lower the adjacent end of the beam 26, thus oscillating the beam and piston through its full range of movement. As has been mentioned, one end of the casing 16 is secured to the bracket 15 while the other end of this casing is secured to the transmission housing adjacent to the arm 30. The transmission end of the wire 17 is provided with a clevis 32 which is secured to the free end of the arm 30. Thus, oscillation of the rod 11 causes the shaft 29 to oscillate, which oscillation causes the beam 26 to oscillate into contact with either one or the other of the shafts 24.

Means will now be described whereby fore and aft reciprocation of the shifter ball 12 causes reciprocation of the piston 21. The housing member 10 is provided with a bore 33 which extends from its rearmost end to position spaced slightly from the front end, while a second bore 34 extends from the front end of the member almost through the forward end of the housing. These two bores are spaced one on each side of the central rod 11. A plunger 35 is reciprocally mounted in the bore 33, while a second plunger 36 is reciprocally mounted in the bore 34. Arms 37 project laterally from the outer ends of these plungers, each of these arms having an opening therein through which the shaft 11 extends. The shaft 11 adjacent to each of the arms 37 is provided with an annular groove 38 therein, into which suitable pins 39 extend. Thus, reciprocation of the shaft 11 in a forward direction moves the plunger 35 into the bore 33 and at the same time draws the plunger 36 out of the bore 34. Suitable cup washers 40 are provided on the inner end of each of the plungers 35 and 36 so that a fluid tight seal between the bores and plungers is obtained. It will be noted that tube 41 is connected to the bottom end of the bore 34, while a tube 42 is in communication with the bottom end of the bore 33. These two tubes extend from the housing 10 to position adjacent to the transmission cover 19. The tube 42 is connected to the forward end of the cover 19 so as to be in communication with the space in front of piston 21, while the tube 41 is connected to the rearmost end of the transmission so as to be in communication with the space in the rear of the plunger 21.

When the system is filled with a noncompressible fluid, such as glycerine or oil, the forward movement of the shifter ball 12 will discharge fluid from the bore 33 through the tube 42 and into the space in front of the piston 21, thereby forcing the piston rearwardly and forcing the fluid which is at the rear of the piston 21 back through the tube 41 into the bore 34. In like manner a rearward movement of the shifter ball forces the fluid in the bore 34 to the space in the rear of the plunger 21, thereby forcing the plunger forwardly and forcing the fluid ahead of this plunger back into the bore 33.

During the normal operation of such device there is usually some leakage, and it is to replenish the fluid caused by such leakage that I have provided a valve mechanism 43. This valve is provided with a chamber 45 which is connected with a fluid reservoir 44 and each of the tubes 41 and 42 extend through the valve member 43 and each is connected to the chamber 45 by means of ball check valves 46. When leakage occurs in the pressure side of the system a slight vacuum is placed on the other side of the system, which vacuum causes one of the ball check valves 46 to open and supply sufficient fluid from the reservoir 44 to equalize the vacuum.

The operation of the manual form of my device is as follows:

When the ball 12 is shifted laterally towards the left the wire 17 is drawn upwardly, which causes the slotted end of the beam 26 to raise thereby engaging the plunger 21 with the low and reverse shifter shaft 24. The ball 12 is then moved rearwardly to engage the low speed gearing, which movement forces out the fluid in the bore 34 thereby moving the piston 21 forwardly. It will be noted that the beam 26 moves forwardly with the piston 21 so as to be out of engagement with the cam 31; however, at such time, the bottom edge of the beam adjacent to the slot 28 slides upon the full diameter of the second and direct speed shaft 24 so that the beam 26 cannot be oscillated out of engagement with the slot in the low and reverse speed shifter shaft. Thus a return of the piston always causes the cam 31 to enter the slot 28.

When it is desired to shift the device into either second or high speed, the ball 12 is returned to its neutral position and as the ball is moved laterally towards the right, the beam 26 is oscillated so that it engages the second and direct speed shifter shaft 24. The aforementioned fore and aft movement of the shifter ball 12 thereby moves the second and direct speed shaft in a like manner to that just described.

The foregoing description related to the manual or direct actuating type of control. Means will now be described which consists of a pre-selector type of control, differing from the aforementioned type only in that the vehicle clutch pedal movement is used to actually shift the gears instead of the fore and aft movement of the shifter ball 12. The mechanism associated with the transmission proper is identical in each case.

Referring to Figure 9, I have designated by numeral 48 the body or housing of my pre-selector mechanism, which housing is secured on the under side of the cowl in a manner similar to the fastening of the body member 10. The housing is provided with a pair of parallel bores 49 which extend likewise therein, the forward end of each of these bores being closed and a pair of pistons 50 being reciprocally mounted in the respective bores 49. Each of these pistons is provided with a cup washer 51 on its forward end so that reciprocation of these pistons will force fluid in and out of the bores 49. It will be noted from Figures 10 and 13 that each of the pistons 50 has a rack 52 machined in one side thereof and that a pinion 53 is rotatably mounted in an opening 47 in the housing, which opening is disposed between the two pistons so that the pinion meshes with both racks 52. Thus, when one of the pistons 50 is pushed inwardly in its bore 49, the other piston is positively forced outwardly in its bore at an equal speed so that the combined fluid capacity of piston chambers is at all times constant.

As has been mentioned, the power required to operate this device is obtained from the clutch pedal which is shown in Figure 9 by reference numeral 54. This pedal has an arm 55 associated therewith which is connected to a rod 56, this rod extending upwardly through a sleeve 57. A compression spring 58 is disposed between the sleeve 57 and the upper end of the rod 56 so that a downward movement of the rod either compresses the spring 58 or moves the sleeve 57 downwardly. A bracket 59 extends forwardly from the housing 48 to which bracket the intermediate portion of a bell crank lever 60 is pivotally mounted. One arm of the lever 60 is pivotally secured to the sleeve 57 while the other arm extends upwardly so as to be substantially in line with the pistons 50. Thus, upon depression of the clutch pedal 54 the upper half of the bell crank lever 60 is urged forwardly from the housing 48.

It will be noted that a pair of rods 61 are mounted to reciprocate through the housing 48 in directions parallel to the pistons 50. The forward ends of these rods 61 are fixedly secured to a cross arm 62, while the center portion of this cross arm is pivotally secured to the bell crank lever 60. The rearmost ends of the rods 61 are connected by a yoke 63 and a pair of compression springs 64 extend between the housing and this yoke and resiliently urge the yoke and rods 61 rearwardly at all times.

Referring to Figure 10 a shaft 65 is rotatably mounted in the rearward portion of the housing 48, and extends rearwardly through the yoke 63. This shaft is provided with a longitudinal keyway 66 therein. A selector member 67 is reciprocally mounted upon the shaft 66 between the body 48 and the yoke 65, which selector is keyed to the shaft so that rotation of the shaft likewise rotates the selector. A pair of ears 68 extend from opposite sides of the selector 67 which ears are arranged to coact with the outer ends of both pistons 50 upon the depression of the clutch pedal when the device is in the position shown in Figure 12. A finger 69 is formed integrally with the selector 67 and extends forwardly therefrom, this finger being located halfway between the ears 68. It has been mentioned that when the device is in the position shown by Figure 12 each ear will coact with the outer end of one of the pistons 50 so that these pistons will be exactly centered, as shown in Figure 10. When the selector is rotated through a 90° angle from that shown in Figure 12 then the finger 69 will bear against one of the pistons and neither ear will coact with the pistons so that the piston which coacts with the finger 69 will be forced downwardly, the other piston being forced outwardly by pinion 53. Thus, movement of the selector in a clockwise direction through 90° from that shown in Figure 12 will align the finger with the left hand piston while movement through 90° counterclockwise will align the finger with the other piston.

Referring to Figure 11, it will be noted that a pinion 70 is fixed to the forward end of the shaft 66, which pinion meshes with a gear 71 which is rotatably mounted in a suitable bracket formed in the upper portion of the housing 48. A two-to-one reduction is obtained from the pinion 70 to the gear 71, so that upon one revolution of the gear 71 the pinion 70 will rotate through two complete revolutions. A selector shaft 72 is fixed to the gear 71, one end of this shaft extending upwardly to position adjacent to the driver of the vehicle where an arm 73 is fixed thereto, while the lower end of the shaft 72 is fixed to a crank 74, which crank 74 functions in a manner similar to the arm 14 in the manually operated device. The flexible wire 17 is secured to the free end of this crank 74 while a bracket 75 extends outwardly from the housing 48 and has the casing fixedly secured thereto.
The left hand piston 50 in Figure 12 is connected to the tube 41 while the right hand piston is connected to the tube 42. Thus, when the left hand piston is moved inwardly by the selector finger 69, the piston 21 will be moved forwardly to engage either the first or third speeds, and when the right hand piston 50 is moved inwardly the piston 21 will be moved rearwardly to engage either the reverse or second speeds.

The operation of the device is as follows:
The selector arm 73 is usually placed in either the first or reverse speed position, as shown in Figure 14. When the lever is placed in either of these positions, the wire 17 is extended to thereby cause the beam 26 in the transmission to coact with the first and reverse speed transmission shaft 24. If now the clutch pedal is depressed the selector 67 will be moved forwardly so that the finger 69 will move one or the other of the pistons 50, depending upon the position of the selector. If the first speed position is chosen, the arm 73 must be moved counterclockwise through 45 degrees, which moves the selector clockwise through 90 degrees and thus aligns the finger 69 with the left hand piston 50 so that operation of the clutch pedal moves the piston 24 forwardly to engage the first speed ratio. A further counter-clockwise movement of the arm 73 through 90 degrees to the second speed position causes the selector 67 to rotate clockwise through 180 degrees and thus causes the finger 69 to be aligned with the right hand or reverse and second speed pistons 50. A movement of the arm 73 to the third speed position causes the finger 69 to be aligned with the opposite or first and third speed pistons 50. The selector 67 has only two engagement positions; that is, in one position it will operate either the first and third speeds while in the other position it will operate either the reverse or second speed.
The position of the arm 74 controls which of the speeds are engaged. In the neutral position the ears 68 center both pistons 50 to thereby center the piston 21 in the transmission.

Among the many advantages arising from the use of my improved device, it may be well to mention that the fluid actuating portion of my device is comparatively simple and durable, being no more complicated than the conventional hydraulic brake system, while the mechanical system employed for selecting which of the transmission shafts is to be actuated is likewise comparatively simple. The unique feature of this device is that the selecting is done through a relatively simple mechanical device, while the power is applied through a hydraulic medium. It is believed that this arrangement is far superior to either a wholly mechanical or hydraulic system.

Some changes may be made in the arrangement, construction and combination of the various parts of my improved device without departing from the spirit of my invention, and it is my intention to cover by my claims such changes as may reasonably be included within the scope thereof.

I claim as my invention:
1. A device adapted to actuate a sliding gear type transmission, said transmission having a pair of axially shiftable elements therein each of which elements effects one of the transmission gear ratios when shifted to either end of its axial movement range comprising, an actuating member mounted for reciprocation in said transmission, a control member, fluid actuated means connecting said actuating member with said control member so that reciprocation of said control member in one plane causes said actuating member to reciprocate, engaging means which operably connects said actuating member to either of said shiftable elements, and a mechanical connection between said control member and said engaging means whereby reciprocation of said control member in another plane engages said actuating member first with one of said shiftable elements and then with the other of said elements.

2. A device adapted to actuate a sliding gear type transmission, said transmission having a pair of axially shiftable elements therein, each of which elements effects one of the transmission gear ratios when shifted to each end of its axial movement range comprising, a control lever, an actuating piston reciprocally mounted in said transmission, a plunger actuated by said control lever, a conduit connecting said piston and plunger whereby reciprocation of said lever in one plane causes said piston to reciprocate, engaging means associated with said piston for connecting the piston to either of said transmission shiftable elements, and a mechanical connection between said control lever and said engaging means whereby reciprocation of said lever in another plane causes said engaging means to connect said piston first with one of said shiftable elements and then with the other of said elements.

3. A device adapted to actuate a sliding gear type transmission, said transmission having a pair of axially shiftable shafts therein each of which effects one of the transmission gear ratios when shifted to each end of its operating range comprising, a double ended piston reciprocally mounted in said transmission, a control lever mounted for universal movement in position adjacent to the driver of the vehicle, a plunger mounted adjacent to said control lever, a conduit connecting said piston with said plunger whereby reciprocation of said control lever in one plane causes said piston to reciprocate in a direction parallel to the operating movement of said shafts, a transverse beam mounted upon said piston, said beam being capable of rocking movement around the axis of said piston into locking engagement with one of said shafts at one end of its rocking stroke and with the other of said shafts at the other end of its stroke, and means for rocking said beam for the above described purpose.

4. A device adapted to actuate a sliding gear type transmission, said transmission having a pair of axially shiftable shafts therein, each of which shafts effects one of the transmission gear ratios when shifted to each end of its operating range comprising, a double ended piston reciprocally mounted in said transmission in position parallel to said shifter shafts, a control lever mounted adjacent to the driver of the vehicle, a pair of plungers reciprocally mounted adjacent to said control lever, one of said plungers being in communication with one end of said piston and the other of said plungers being in communication with the other end of said piston, whereby reciprocation of said control lever in one plane causes said piston to reciprocate, a transverse beam secured to the intermediate portion of said piston, said beam being capable of rocking movement into locking engagement with said transmission shafts at the respective ends of its rocking stroke, and a mechanical connection between said control lever and said beam so that reciprocation of said lever in another plane causes said beam to connect said piston first with one of said shafts and then with the other of said shafts.

5. A device adapted to actuate a sliding gear type transmission, said transmission having a pair of shiftable shafts reciprocally mounted therein, each of which effects one of the transmission gear ratios when shifted to each end of its stroke comprising, a double ended piston reciprocally mounted in said transmission, a pair of plungers reciprocally mounted adjacent to the driver of the vehicle, conduits connecting each of said plungers with the respective ends of said piston, a selector associated with said plungers, which selector may be positioned so as to actuate either one or the other of said plungers, a connection between the vehicle clutch pedal and said selector whereby depression of the clutch pedal will actuate said selector and thus move said piston in either one or the other direction according to the position of said selector, and manually controlled means operatively connecting for reciprocation said piston with either one or the other of said transmission shafts, whereby reciprocation of said piston will reciprocate one or the other of said shafts.

6. A device adapted to selectively reciprocate a pair of shiftable shafts in a sliding gear vehicle transmission comprising, a housing member having a control rod reciprocally and rotatably mounted therein, a pair of plungers mounted in suitable bores in said housing member and connected to said rod so that movement of said rod in one direction causes one plunger to advance into its bore while withdrawing the other plunger and movement of the rod in the other direction will draw the first of said plungers out of its bore while advancing the second in its bore, a double ended piston reciprocally mounted in position adjacent to the transmission of the vehicle, a fluid connection between the respective ends of said piston and the respective plunger bores, a mechanical connection between said piston and each of the shiftable shafts whereby said piston may be selectively connected to either of these two shafts, and means actuated by an oscillating movement of said control shaft for selectively connecting said piston to each of said transmission shafts.

7. A device adapted to selectively reciprocate a pair of shiftable shafts in a sliding gear transmission comprising, a housing member having a control rod rotatably and reciprocally mounted therein, a pair of plungers reciprocally mounted in said housing and connected to said control rod so that reciprocation thereof in one direction will cause one of the plungers to advance into said bore while the other of said plungers recedes from its bore, a piston associated with the transmission of said vehicle, the respective ends of said piston being connected by means of a fluid connection with the respective plungers in said housing, means associated with said piston whereby oscillation of the piston in one direction will mechanically connect said piston with one of said shiftable shafts and oscillation of said piston in the other direction will mechanically connect the piston with the other of said shifter shafts, and means extending between said piston and said control rod whereby oscillation of said control rod will oscillate said piston for the purpose described.

8. A device adapted to selectively reciprocate a pair of shiftable shafts in a sliding gear vehicle transmission comprising, a control rod rotatably and reciprocally mounted in the vehicle in position adjacent to the driver thereof, a piston rotatably and reciprocally mounted in said transmission, means associated with said piston whereby oscillation of the piston will connect for reciprocation said piston first with one of said shiftable shafts, then with the other of said shafts, means extending between said control rod and said piston whereby reciprocation of said control rod reciprocates said piston to thereby reciprocate either one or the other of said shafts, and means extending between said control rod and said piston whereby oscillation of said rod oscillates said piston to thereby select the shaft which is to be reciprocated by said piston.

9. A device adapted to selectively reciprocate a pair of shiftable shafts in a sliding gear transmission comprising, an actuating member reciprocally and rotatably mounted in said transmission, means associated with said transmission for selectively connecting said member with either one or the other of said shiftable shafts, a control member rotatably and reciprocally mounted in the driving compartment of the vehicle, fluid actuating means connecting said control member and said actuating member so that reciprocation of said control member reciprocates said actuating member, and mechanical means connecting said control member and said actuating member so that oscillation of said control member oscillates said actuating member.

10. A device adapted to effect four speed ratios in a vehicle transmission, said transmission having a pair of shiftable members therein, each of which effects one of said gear ratios when moved to each end of its shiftable stroke comprising, a double ended piston adapted to reciprocate in position adjacent to said transmission, means for selectively connecting said piston with either of said shiftable members so that reciprocation of said piston will move either one or the other of said shiftable members through its full range, a housing having a pair of plunger cylinders therein, a pair of plungers reciprocally mounted in said housing and mechanically connected together so that one of said plungers moves inwardly as the other of said plungers moves outwardly, fluid connections fixedly disposed between each of said cylinder bores and the respective ends of said piston, whereby inward movement of one of said plungers will move said piston in one direction and inward movement of the other of said plungers will move said piston in the opposite direction, outward movement of either inoperative plunger being effected both by said mechanical connection and by the fluid expelled from the inoperative end of said piston, manually operated means for selectively actuating both of said plungers, and mechanically actuated selecting means disposed adjacent to the driver of the vehicle which is mechanically connected to said means for connecting the piston with either of the shiftable members, whereby the driver may select which of said shiftable members is to be moved by said piston and then actuate either of said plungers to move the chosen shiftable member in the desired direction.

LEO O. BURT.